(12) United States Patent
Zagaynov et al.

(10) Patent No.: US 11,816,909 B2
(45) Date of Patent: Nov. 14, 2023

(54) DOCUMENT CLUSTERIZATION USING NEURAL NETWORKS

(71) Applicant: ABBYY Development Inc., Dover, DE (US)

(72) Inventors: Ivan Zagaynov, Dolgoprudniy (RU); Stanislav Semenov, Moscow (RU)

(73) Assignee: ABBYY Development Inc., Raleigh, NC (US)

( * ) Notice: Subject to any disclaimer, the term of this patent is extended or adjusted under 35 U.S.C. 154(b) by 181 days.

(21) Appl. No.: 17/397,440

(22) Filed: Aug. 9, 2021

(65) Prior Publication Data

US 2023/0038097 A1 Feb. 9, 2023

(30) Foreign Application Priority Data

Aug. 4, 2021 (RU) ................. 2021123315

(51) Int. Cl.
*G06V 30/40* (2022.01)
*G06N 3/04* (2023.01)
(Continued)

(52) U.S. Cl.
CPC ............ *G06V 30/40* (2022.01); *G06F 18/213* (2023.01); *G06F 18/23* (2023.01); *G06N 3/04* (2013.01); *G06V 30/18* (2022.01); *G06V 30/41* (2022.01)

(58) Field of Classification Search
CPC ......... G06F 18/213; G06F 18/23; G06N 3/04; G06V 30/18; G06V 30/41; G06V 10/46; G06V 10/82
See application file for complete search history.

(56) References Cited

U.S. PATENT DOCUMENTS 8,831,361 B2 9/2014 Pintsov
9,122,955 B2 9/2015 Greenspan et al.
(Continued)

FOREIGN PATENT DOCUMENTS

EP 2973226 A4 6/2016
RU 2668717 C1 10/2018
(Continued)

OTHER PUBLICATIONS

Karim et al., "Image Classification Using Bag of Visual Words (BoVW)", Department of Computers, University of Technology, Baghdad—Iraq, Department of Computers, Collage of Science, University of Baghdad, Baghdad—Iraq, Al-Nahrain Journal of Science, Dec. 2018, pp. 76-82.

*Primary Examiner* — King Y Poon
*Assistant Examiner* — Michael L Burleson
(74) *Attorney, Agent, or Firm* — Lowenstein Sandler LLP (57) ABSTRACT

An example method of document classification comprises: detecting a set of keypoints in an input image; generating a set of keypoint vectors, wherein each keypoint vector of the set of keypoint vectors is associated with a corresponding keypoint of the set of keypoints; extracting a feature map from the input image; producing a combination of the set of keypoint vectors with the feature map; transforming the combination into a set of keypoint mapping vectors according to a predefined mapping scheme; estimating, based on the set of keypoint mapping vectors, a plurality of importance factors associated with the set of keypoints; and classifying the input image based on the set of keypoints and the plurality of importance factors.

20 Claims, 6 Drawing Sheets (51) Int. Cl.
*G06F 18/23* (2023.01)
*G06F 18/213* (2023.01)
*G06V 30/18* (2022.01)
*G06V 30/41* (2022.01)

(56) References Cited

U.S. PATENT DOCUMENTS

| | | | |
|---|---|---|---|
| 10,922,540 | B2 | 2/2021 | Stanley et al. |
| 10,977,524 | B2 | 4/2021 | Samala |
| 2019/0294874 | A1 | 9/2019 | Orlov et al. |
| 2020/0342059 | A1 | 10/2020 | Ziuzin et al. |
| 2020/0356821 | A1 | 11/2020 | Zhang et al. |
| 2021/0049401 | A1 | 2/2021 | Jean et al. |
| 2021/0150338 | A1 | 5/2021 | Semenov |
| 2021/0279502 | A1* | 9/2021 | McEachern .......... G06V 40/172 |
| 2021/0365707 | A1* | 11/2021 | Mao ...................... H04N 23/45 |

FOREIGN PATENT DOCUMENTS

| | | |
|---|---|---|
| RU | 2672395 C1 | 11/2018 |
| RU | 2701995 C2 | 10/2019 |

\* cited by examiner

DOCUMENT CLUSTERIZATION USING NEURAL NETWORKS

RELATED APPLICATIONS

This application claims priority under 35 USC § 119 to Russian patent application No. RU 2021123315, filed Aug. 4, 2021.

TECHNICAL FIELD

The implementations of the disclosure relate generally to computer systems and, more specifically, to systems and methods for document classification using neural networks.

BACKGROUND

Document classification is a foundational operation in information extraction. Conventional approaches may exhibit high computational complexity, dependence on training data availability and various other deficiencies.

SUMMARY OF THE DISCLOSURE

In accordance with one or more aspects of the present disclosure, an example method of document classification based on the appearance of certain visual words in the document images includes: detecting, by a processing device, a set of keypoints in an input image; generating a set of keypoint vectors, wherein each keypoint vector of the set of keypoint vectors is associated with a corresponding keypoint of the set of keypoints; extracting a feature map from the input image; producing a combination of the set of keypoint vectors with the feature map; transforming the combination into a set of keypoint mapping vectors according to a predefined mapping scheme; estimating, based on the set of keypoint mapping vectors, a plurality of importance factors associated with the set of keypoints; and classifying the input image based on the set of keypoints and the plurality of importance factors.

In accordance with one or more aspects of the present disclosure, an example system for document classification based on the appearance of certain visual words in the document images comprises a memory and a processor coupled to the memory, the processor configured to: detect a set of keypoints in an input image; generate a set of keypoint vectors, wherein each keypoint vector of the set of keypoint vectors is associated with a corresponding keypoint of the set of keypoints; extract a feature map from the input image; produce a combination of the set of keypoint vectors with the feature map; transform the combination into a set of keypoint mapping vectors according to a predefined mapping scheme; estimate, based on the set of keypoint mapping vectors, a plurality of importance factors associated with the set of keypoints; and classify the input image based on the set of keypoints and the plurality of importance factors In accordance with one or more aspects of the present disclosure, an example computer-readable non-transitory storage medium comprises executable instructions that, when executed by a computer system, cause the computer system to: detect a set of visual words in an input image; generate a set of visual word vectors, wherein each visual word vector of the set of visual word vectors is associated with a corresponding visual word of the set of visual words; extract a feature map from the input image; produce a combination of the set of visual word vectors with the feature map; transform the combination into a set of visual word mapping vectors according to a predefined mapping scheme; estimate, based on the set of visual word mapping vectors, a plurality of importance factors associated with the set of visual words; and classify the input image based on the set of visual words and the plurality of importance factors.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Systems and methods for document classification using neural networks are described. Various conventional approaches may exhibit high computational complexity and dependence on training data availability.

Aspects of the disclosure address the above noted and other deficiencies by providing neural network-based methods for document classification. As used herein, "electronic document" (or "document") may refer to any indicia-bearing medium, an image if which is accessible to a computing system that performs document classification and/or various other information extraction tasks. The image may be a scanned image, a photographed image, or any other representation of a document that is being capable of being converted into a digital form accessible to the computing system. For example, "electronic document" may refer to a file comprising one or more digital content items that may be visually rendered to provide visual representations of the electronic document (e.g., on a display or a printed material). In accordance with various implementations of the present disclosure, a document may conform to any suitable electronic file format, such as PDF, DOC, ODT, JPEG, etc. Although the document may be represented in an electronic (e.g., digital) file format, it is presumed that the document is not electronically structured and that the document layout— locations of various text fields, tables, etc. —is not specified in the electronic file.

An original document may be printed, typed, or handwritten (for example, by filling out a standard form). A document may have a variety of fields, such as text fields (containing numerals, numbers, letters, words, sentences), graphics field (containing a logo or any other image), tables (having rows, columns, cells), and so on.

The techniques described herein involve training one or more neural networks to perform document classification based on the appearance of certain keypoints in the document images. The "keypoints" detected in the image are points of interest corresponding to certain distinguishing features of object(s) found in an image.

In some implementations, the techniques described herein may be utilized to perform document classification based on the appearance of certain visual words in the document images. "Visual word" refers to a part of the image represented by an array of pixels, which carries some information related to the image features (such as the color, shape or texture). Thus, visual words may exist in their feature space of continuous values. In some cases, visual words can include stable sets of keypoints.

Each neural network may include multiple neurons that are associated with learnable weights and biases. The neurons may be arranged in multiple layers. A neural network may be trained on a training dataset of documents with known classification. The neural network may generate an observed output for each training input. The observed output of the neural network may be compared with the corresponding known output corresponding to the training input as specified by the training data set, and the error may be propagated back to the previous layers of the neural network, whose parameters (e.g., the weights and biases of the neurons) may be adjusted accordingly in order to optimize the prediction accuracy.

Once trained, the neural network may be used for automatic classification of input documents, thus improving both classification accuracy and the computational complexity as compared with various common systems and methods.

Figure 1:
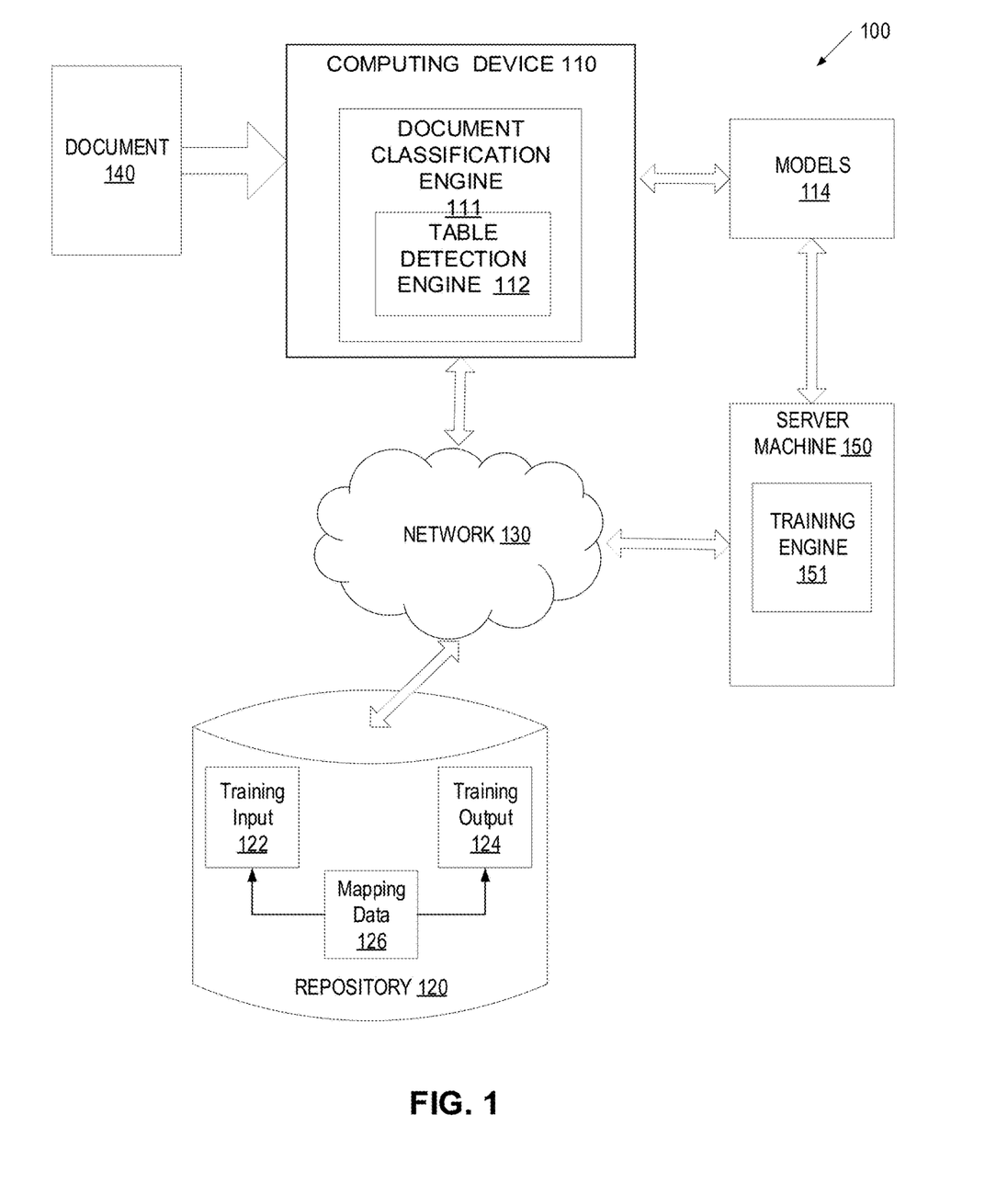
FIG. 1 is a block diagram of an example computer system in which implementations of the disclosure may operate.

FIG. 1 is a block diagram of an example computer system 100 in which implementations of the disclosure may operate. As illustrated, system 100 can include a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 can be (and/or include) one or more computing devices 800 of FIG. 6.

A document 140 may be received by the computing device 110. The document 140 may include any suitable text(s), image(s), or table(s), including one or more characters (e.g., letters and/or numbers), words, sentences, etc. The document 140 may be of any suitable type, such as "business card," "invoice," "passport," "medical policy," "questionnaire," etc. The type of the document 140 may be specified by a user and communicated to the computing device 110 together with the document 140, in some implementations.

The document 140 may be received in any suitable manner. For example, the computing device 110 may receive a digital copy of the document 140 by scanning a document or photographing the document. Additionally, in instances where the computing device 110 is a server, a client device connected to the server via the network 130 may upload a digital copy of the document 140 to the server. In instances where the computing device 110 is a client device connected to a server via the network 130, the client device may download the document 140 from the server or from the repository 120.

The document 140 may be used to train a set of machine learning models (trainable classifiers) or may be a new electronic document for which field/table detection and/or classification is desired. In some implementations, if used for training one or more trainable classifiers 114 for subsequent recognition, the document 140 may be appropriately pre-processed to facilitate the training. For instance, the document image may be normalized, scaled, and/or binarized. In some implementations, text in the document 140 may be recognized using any suitable optical character recognition (OCR) technique.

In one implementation, computing device 110 may implement a classification engine 111, which may include one or more software modules including executable instructions stored on one or more tangible, machine-readable storage media of the computing device 110 and executable by one or more processing devices of the computing device 110.

In one implementation, the classification engine 111 may use a set of trainable models 114. The classification engine 111 may preprocess any documents prior to using the documents for training the model(s) 114 and/or applying the trained model(s) 114 to the documents. In some instances, the trained model(s) 114 may be part of the classification engine 111 or may be accessed on another machine (e.g., server machine 150) by the classification engine 111. Based on the output of the trained model(s) 114, the classification engine 111 may classify each of the documents into one of a plurality of classes corresponding to predetermined document types.

The classification engine 111 may be a client-based application or may be a combination of a client component and a server component. In some implementations, classification engine 111 may execute entirely on the client computing device such as a tablet computer, a smart phone, a notebook computer, a camera, a video camera, or the like. Alternatively, a client component of classification engine 111 executing on a client computing device may receive a document and transmit it to a server component of the classification engine 111 executing on a server device that performs the field detection and/or classification. The server component of the classification engine 111 may then return the classification result to the client component of the classification engine 111 executing on the client computing device for storage. Alternatively, the server component of the classification engine 111 may provide the classification result to another application. In other implementations, classification engine 111 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the model(s) 114 for document classification. The model(s) 114, as illustrated in FIG. 1, may be trained by the training engine 151 using training data that includes training inputs and corresponding training outputs (e.g., classification labels for respective training inputs).

The set of models 114 may include, e.g., a single level of linear or non-linear operations (e.g., a support vector machine [SVM]) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the model(s) 114 may include one or more neural networks as described in connection with FIGS. 2-4.

For example, the training engine 151 may generate training data to train the model(s) 114. The training data may be stored in a repository 120 and include one or more training inputs 122 and one or more training outputs 124. The training data may also include mapping data 126 that maps the training inputs 122 to the training outputs 124. The training inputs 122 may include a training set of documents including text, images, or tables (also referred to as the "training documents"). Each of the training documents may be a document labeled with a known document type, thus forming the training outputs 124. In training the model(s) 114, the training engine 151 can find patterns in the training data that can be used to map the training inputs to the training outputs. The patterns can be subsequently used by the model(s) 114 for future predictions.

The repository 120 may be a persistent storage capable of storing documents as well as data structures to perform character recognition in accordance with implementations of the present disclosure. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

In some implementations, the training engine 151 may train an artificial neural network that comprises multiple neurons to perform document classification in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from adjacent layers are connected by weighted edges. The edge weights are defined at the network training stage based on a training dataset that includes a plurality of documents with known classification of fields. In an illustrative example, all the edge weights may be initially assigned some random values. For every input 122 in the training dataset, the training engine 151 may activate the neural network. The observed output of the neural network $OUTPUT_{NN}$ (TRAINING INPUT) is compared with the desired training output 124 specified by the training data set: Compare: $OUTPUT_{NN}$ (TRAINING INPUT) vs. TRAINING OUTPUT The resulting error—the difference between the output of the neural network $OUTPUT_{NN}$ and the desired TRAINING OUTPUT is propagated back to the previous layers of the neural network, in which the weights are adjusted so as to modify the $OUTPUT_{NN}$ and make it closer to the TRAINING OUTPUT. This adjustment may be repeated until the output error for a particular training input 122 satisfies a predetermined condition (e.g., falling below a predetermined threshold). Subsequently, a different training input 122 may be selected, a new $OUTPUT_{NN}$ may be generated, a new series of adjustments may be implemented and so on, until the neural network is trained to a sufficient degree of accuracy.

Once the trainable classifiers 114 are trained, the set of trainable classifiers 114 can be provided to classification engine 111 for analysis of new documents. For example, the classification engine 111 may perform document classification based on the keypoints extracted from the document images. For a given object, a set of keypoints, which can initially be derived from a set of reference images, can subsequently be used for identifying the same or similar objects in previously unseen images. Thus, the classification engine 111 can predict the document type of the document 140 based on the set of keypoints detected in the document 140.

Figure 2:
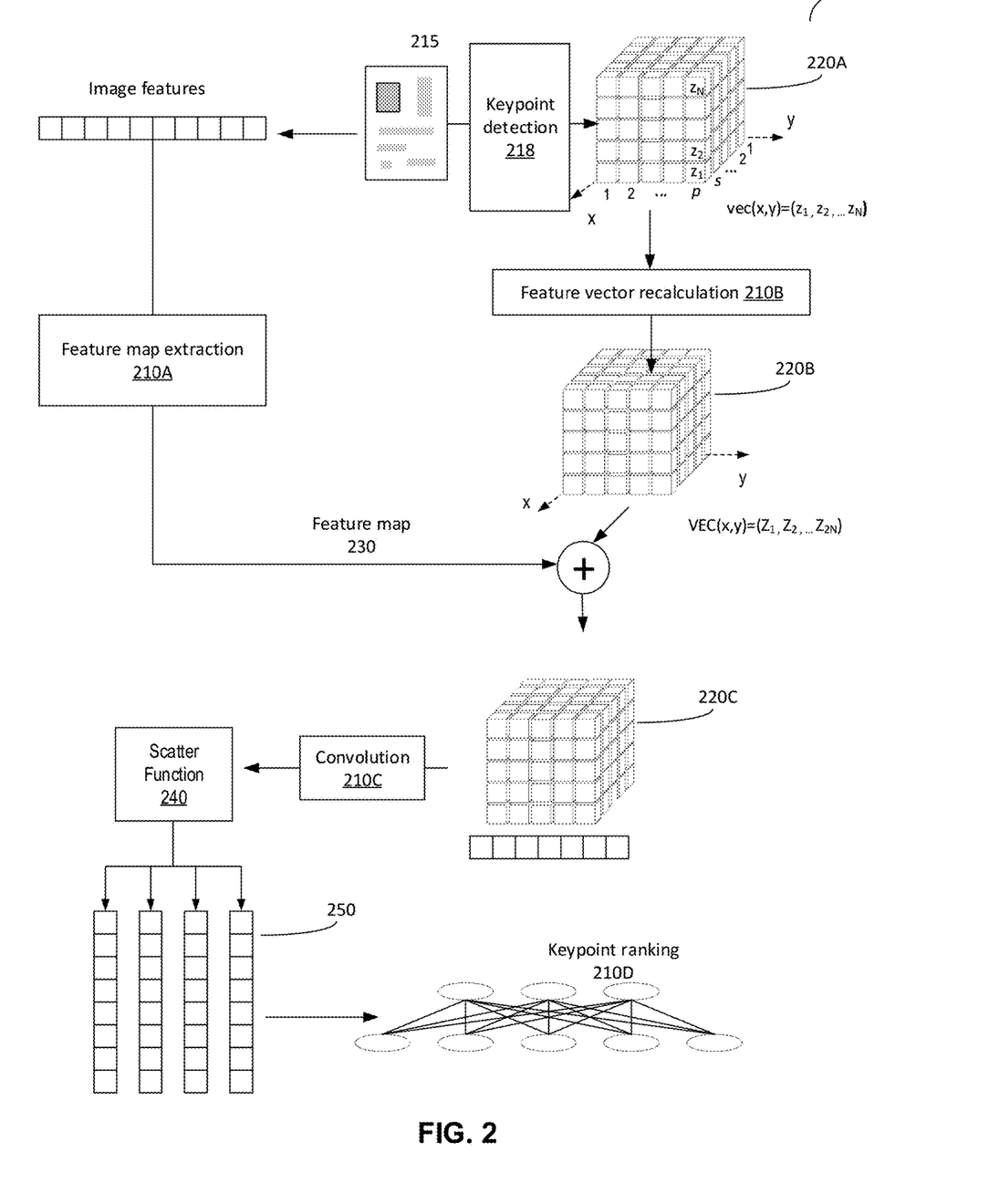
FIG. 2 is a schematic diagram illustrating an example workflow of training a neural network for document classification, in accordance with aspects of the present disclosure.

FIG. 2 is a schematic diagram illustrating an example workflow of training a neural network for document classification, in accordance with some implementations of the present disclosure. As schematically illustrated by FIG. 2, the neural network system 200 may include multiple modules, e.g., the feature map extraction module 210A, the feature vector recalculation module 210B, the convolution module 210C, and the keypoint ranking module 210D. Each of the modules 210A-210D may be represented by a neural network including multiple neuron layers of various types, as described in more detail herein below. In some implementations, each of the modules 210A-210D is represented by a dedicated neural network; alternatively, two or more of the modules 210A-210D can be implemented by a single neural network.

In an illustrative example, the input document image 215, which can be obtained, e.g., by scanning or photographing an original document, is pre-processed and fed into the keypoint detection module 218. The optional pre-processing may include, e.g., scaling, changing the aspect ratio, grayscaling, normalization, data augmentation, amplification, binarization, and/or various other operations directed at improving the image quality.

In some implementations, the keypoint detection module 218 may be provided by one or more software modules, which may implement, e.g., the scale-invariant feature transform (SIFT) algorithm. Initially, SIFT extracts a starting set of keypoints from a set of reference images. A given object may then be recognized in a new (previously unseen) image by comparing each feature from the new image to the initial set of keypoints and identifying candidate matching keypoints (e.g., based on Euclidean distance of their feature vectors). From the full set of matching keypoints, the keypoints that also match on the location, scale, and orientation of the object in the new image are selected. Each identified feature cluster can then undergo further detailed verification in order to discard outliers. Finally, the probability of a particular set of features indicating the presence of the object is computed.

Alternatively, locally likely arrangement hashing (LLAH) may be implemented by the keypoint detection module 218 for keypoint matching using multiple viewpoints, resulting in a set of keypoints that are represented by geometrically invariant combinations.

In other implementations, various other keypoint detection algorithms may be implemented by the keypoint detection module 218, e.g., Speeded-Up Robust Features (SURF), Kaze, Oriented FAST and Rotated Brief (ORB), Binary Robust Invariant Scalable Keypoints (BRISK), or other suitable algorithms.

The detected keypoints are then arranged into the three-dimensional matrix 220A, which includes, for every pair of coordinates (x,y) a feature vector corresponding to the keypoint located at the position (x,y) in the document image. The coordinates may be Cartesian coordinates or any other coordinates that may be convenient in identifying locations of the symbol sequences.

The vector space for vectors vec(x,y) representing the detected keypoints may have a number of dimensions N chosen based on the complexity and diversity of the input document images. For a given number of dimensions N, each vector may have N components, vec(x,y)=($z_1$, $z_2$, $z_N$), wherein $z_j$ may be an integer or real number. In some implementations, some of the vectors vec(x,y) may have fewer than N elements, in which case, the remaining components of the vector may be assigned zero vales.

As schematically illustrated by FIG. 2, the three-dimensional matrix 220A is composed of the components of individual vectors in the set {vec(x,y)}. Along the in-plane directions x and y, the area of the input document image 215 may be discretized into p cells along the direction of x and s cells along the direction of y. A keypoint centered over a particular cell (x,y) may have its vector representation vec(x,y)=($z_1$, $z_2$, $z_N$) visualized as a sequence of blocks (cells) stacked along the third direction. Some of the cells (or vertical stacks) of the three-dimensional matrix 220A may be empty (e.g., filled with zeros). For example, the cells stacked above the coordinates (x,y) that correspond to empty spaces of the document image 210 may have all zeros.

The three-dimensional matrix 220A may be fed into the feature vector recalculation module 210B, which for every input vector vec(x,y) would produce a corresponding output vector VEC (x,y) reflecting the global context of the whole document image, as described in more detail herein below with reference to FIG. 3. Accordingly, each output vector VEC(x,y)=($Z_1$, $Z_2$, ... $Z_{2N}$) would not only represent the keypoint located at the specified coordinates (x,y) within the input document image 215, but also reflect the presence, positions, and values of other keypoints in the input document image 215.

The resulting output values VEC(x,y)=($Z_1$, $Z_2$, ... $Z_{2N}$) may collectively form the transformed three-dimensional matrix 220B, which is then combined with the feature map 230 that is extracted from the input document image 215 by the feature map extraction module 210A. In some implementations, combining the three-dimensional matrix 220B with the feature map 230 may involve concatenating the vectors of the transformed three-dimensional matrix 220B with the feature map 230; alternatively, combining the three-dimensional matrix 220B with the feature map 230 may involve summing the vectors of the transformed three-dimensional matrix 220B with the feature map 230.

The feature map extraction module 210A may produce the feature map 230 by applying a set of convolution filters to the input image. In some implementations, the feature map extraction module 210A may be provided by a neural network that includes multiple stacks of convolution layers separated by max pooling layers; the last stack may be followed by one or more fully-connected layers and a softmax layer. The feature map 230 produced by the feature map extraction module 210A may be represented, e.g., by a matrix of integer or real values.

The result 220C of combining the transformed three-dimensional matrix 220B and the feature map 230 is then fed into the convolution module 210C, which includes one or more convolution layers. The output of the convolution module 210C is then transformed, by the scatter function 240 into a set of vectors 250. In some implementations, the scatter function 240 combines two components of its input vector ($Z_1$, $Z_2$, ... $Z_N$, $Z_{N+1}$, $Z_{2N}$) according to a predefined mapping scheme (e.g., $Z_k + Z_{N+k} \to Z_k$) that reduces the number of vector components from 2N to N. In some implementations, the scatter function 240 may first eliminate zero components of the vector ($Z_1$, $Z_2$, ... $Z_N$, $Z_{N+1}$, $Z_{2N}$) and select the first N (the last N, the largest N, etc.) remaining components. In other implementations, a dense neural network layer having 2N inputs and N outputs may reduce the input vector ($Z_1$, $Z_2$, $Z_N$, $Z_{N+1}$, $Z_{2N}$) into a reduced vector VEC(x,y)=($Z_1$, $Z_2$, $Z_N$).

The resulting set of keypoint mapping vectors 250 is then fed to the keypoint ranking module 210D, which can be implemented by a set of fully-connected layers, in which every neuron in one layer is connected to every neuron in another layer. The keypoint ranking module 210D can be trained to estimate the relative importance of each keypoint for the input document image, as described in more detail herein below.

The set of keypoints with their respective importance factors produced by the keypoint ranking module 210D may be utilized for document clusterization and/or classification. In some implementation, a threshold importance value can be chosen (e.g., 80%, 90%, or some other value), such that the keypoints having their respective importance factors exceeding the chosen threshold importance value may be utilized for associating the keypoints with the respective document clusters. In some implementations, the threshold importance value can be chosen, e.g., empirically, as the value that results in the most accurate document classification.

In an illustrative example, a training data set may include a set of records, such that each record associates a set of keypoints with a document cluster (e.g., reflecting the document type). The training data set can be employed for training a classifier (e.g., a neural network) for predicting the document cluster based on the set of keypoints produced by the keypoint ranking module 210D and filtered based on comparing their respective importance factors to the chosen importance value threshold.

In some implementations, each document cluster is chosen for training a separate set of models for information extraction from the documents of the corresponding document type, e.g., for recognizing the document structure (e.g., tables, sections, etc.), extracting values of certain document fields, and/or performing other information extraction tasks.

As noted herein above, the keypoint ranking module 210D can be trained to estimate the relative importance of each keypoint for the input document image. The keypoint importance for a specified document type can be determined based on one or more factors, including, e.g., the frequency of occurrence of a given keypoint in the documents of the specified document type, the mutual information (mutual dependence) of one or more keypoints with respect to the positions of one or more document elements (e.g., document fields), and/or various other factors.

For determining the mutual information, both the position of a specified document element and the position and value of a specified keypoint are assumed to be random values. The mutual information would describe the amount of information the two random values carry about each other:

$$MI(x,y) = H(x) - H(x|y) = H(x) + H(y) - H(x,y),$$

where H is the entropy of the random value.

The mutual information computed for the pairs of keypoints and document elements is aggregated over all keypoints of the document.

In some implementations, the training data set for training the classifier for predicting the document cluster based on the set of keypoints produced by the keypoint ranking module 210D can be based on manual clusterization of the training documents. Alternatively, various automated clusterization methods (e.g., differential evolution) can be employed for classifier training.

Figure 3:
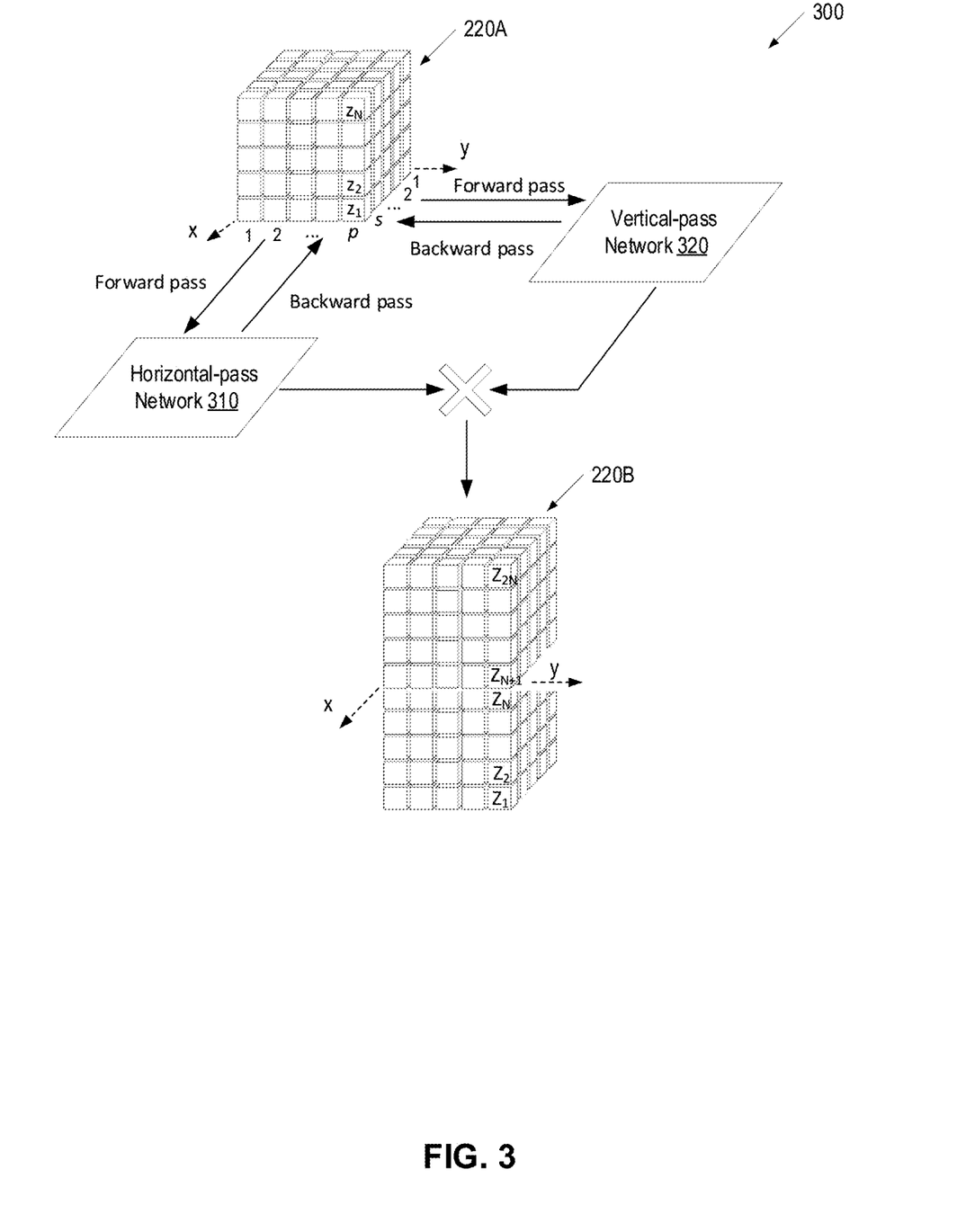
FIG. 3 is a schematic diagram illustrating an example neural network that recalculates the values of the vector representations of various symbol sequences of an input document based on the global document context, in accordance with aspects of the present disclosure.

FIG. 3 is a schematic diagram illustrating an example neural network 300 that recalculates the values of the vector representations of various symbol sequences of an input document based on the global document context, in accordance with some implementations of the present disclosure. The neural network 300 implements the functions of the feature vector recalculation module 210B, in one implementation. The neural network 300 may be implemented by the document classification engine 111.

The neural network 300 may include one or more neural networks each containing a plurality of layers of neurons. In some implementation, the neural network 300 may include two neural networks, a horizontal-pass network 310 and a vertical-pass network 320. In some implementations, the horizontal-pass network 310 and the vertical-pass network 320 may be long short-term memory (LSTM) networks. In other implementations, the horizontal-pass network 310 and the vertical-pass network 320 may be RNNs or Attention-based LSTM networks.

The horizontal-pass network 310 and the vertical-pass network 320 may perform a plurality of passes along the horizontal (x) and vertical (y) dimensions of the three-dimensional matrix 220. More specifically, the horizontal-pass network 310 may select, in consecutive iterations, each column of the base (the bottom plane of cells) and the vertical-pass network 320 may similarly select each row of the base. The null vectors may be ignored. The horizontal-pass network 310 and the vertical-pass network 320 may recalculate vector components, $vec(x,y)=(z_1, z_2, z_N) \rightarrow VEC(x,y)=(Z_1, Z_2, \ldots Z_N)$, for some or all of the vectors $\{vec(x,y)\}$ so that the values $VEC(x,y)=(Z_1, Z_2, \ldots Z_N)$ are recalculated based on the values of all vectors $\{vec(x,y)\}$ of the document and, therefore, the new values $\{VEC(x,y)\}$ may depend on the global context of the entire document.

In some implementations, the horizontal-pass network 310 may iteratively select consecutive values of columns j, such that $1 \leq j \leq s$. For each j, the horizontal-pass network 310 may identify a plane of vector components $z_1 (x_j,y_k)$, $z_1 (x_j,y_k)$, $z_N (x_j,y_k)$ located in the cell of the three-dimensional matrix 220 having the same column index j but various possible row indices k. The horizontal-pass network 310 may then use parameters (e.g., weights and biases) of the network 310 to modify the values of the vector components $z_1 (x_j,y_k)$, $z_1 (x_j,y_k)$, $z_N (x_j,y_k)$ based on the values in the preceding plane, $z_1 (x_{j-1},y_k)$, $z_1 (x_{j-1},y_k)$, $z_N (x_{j-1},y_k)$, or a fixed number (two, three, ten, or any other number) of preceding planes. In some implementations, the values for the column plane j may be recalculated based on all preceding planes, having indices from 1 to j−1. After recalculation of the values of the vector components $z_1 (x_j,y_k)$, $z_1 (x_j,y_k)$, $z_N (x_j,y_k)$ for the column-plane j, the horizontal-pass network 310 may proceed with recalculating the values of the vector components for the next plane, $z_1 (x_{j+1},y_k)$, $z_1 (x_{j+1},y_k)$, $z_N (x_{j+1},y_k)$, and so on, until all columns of the three-dimensional matrix 220 are recalculated.

The horizontal-pass network 310 may perform multiple horizontal passes as described above. In some implementations, some of the passes may be performed in the backward direction, e.g., starting with j=s and proceeding towards smaller values of j until the column j=1 is reached and recalculated.

The vertical-pass network 320 may likewise select, in consecutive iterations, each one of the p rows of the base plane of cells of the three-dimensional matrix 220 and similarly recalculate the vector components based on the values of all vectors $\{vec(x,y)\}$ of the document. For example, the vertical-pass network 320 may iteratively select consecutive values of rows k, such that $1 \leq k \leq p$. For each k, the vertical-pass network 320 may identify a plane of vector components $z_1 (x_j,y_k)$, $z_1 (x_j,y_k)$, $z_N (x_j,y_k)$ located in the cell of the three-dimensional matrix 220 having the same row index k but various possible column indices j. The vertical-pass network 320 may then use parameters (e.g., weights and biases) of the network 320 to modify the values of the vector components $z_1 (x_j,y_k)$, $z_1 (x_j,y_k)$, $z_N (x_j,y_k)$ based on the values in the preceding plane, $z_1 (x_j,y_{k-1})$, $z_1 (x_j,y_{k-1})$, $z_N (x_j,y_{k-1})$, or a fixed number (two, three, ten, or any other number) of preceding planes. In some implementations, the values for the row-plane k may be recalculated based on all preceding row-planes, having indices from 1 to k−1. After recalculation of the values of the vector components $z_1 (x_j,y_k)$, $z_1 (x_j,y_k)$, $z_N (x_j,y_k)$ for the row-plane k, the horizontal-pass network 310 may proceed with recalculating the values of the vector components for the next plane, $z_1 (x_j,y_{k+1})$, $z_1 (x_j,y_{k+1})$, $z_N (x_j,y_{k+1})$, and so on, until all rows of the three-dimensional matrix 220 are recalculated.

The parameters of the horizontal-pass network 310 may be different from the parameters of the vertical-pass network 320. The parameters of the two networks may be determined during a training phase by selecting one or more training inputs 122, determining the output of the combined network (neural network 300), comparing the output with training outputs 124 and backpropagating errors through the layers of networks on the horizontal-pass network 310 and the vertical-pass network 320.

During the training phase, the horizontal-pass network 310 and the vertical-pass network 320 may perform a plurality of passes until the error of the output of the neural network 300 falls below some pre-determined error. The passes by the horizontal-pass network 310 and the vertical-pass network 320 may be performed in a variety of orders. For example, in one implementation, the first pass may be a forward pass by the horizontal-pass network 310, the second path may be a backward path by the horizontal-pass network 310, the third pass may be a forward path by the vertical-pass network 320, the fourth pass may be a backward path by the vertical-pass network 320, and so on. This process may be repeated a number of times. Alternatively, in another implementation, the first pass may be a forward pass by the horizontal-pass network 310, the second path may be a forward path by the vertical-pass network 320, the third pass may be a backward path by the horizontal-pass network 310, the fourth pass may be a backward path by the vertical-pass network 320, and so on. In another implementation, each of the two networks may perform multiple (e.g., two, three, or more) passes in the same direction (forward or backward), before the same network may perform multiple passes in the opposite direction, or before the other networks performs multiple passes (in either direction).

The result of the training phase may be a set of parameters (e.g., biases and weights) for the horizontal-pass network 310 and a set of parameters for the vertical-pass network 320. The two sets may be different. Furthermore, each of the two networks may have a set of parameters that is different for forward and backward passes. Additionally, while in some implementations the parameters (e.g., for backward passes of the horizontal-pass network 310) may be independent of where the recalculated column-plane is located, in other implementations, the parameters may depend on such locations. For example, the parameters may be different for column-planes (row-planes) located near the edges of the document from the planes located near the middle of the document.

The output of the horizontal-pass network 310 and the output of the vertical-pass network 320 may be concatenated to produce transformed three-dimensional matrix 220B. The concatenated vectors may have recalculated values VEC(x,y)=$(Z_1, Z_2, \ldots Z_N, Z_{N+1}, Z_{2N})$, having first N components that represent the output of the horizontal-pass network 310 and the last N components that represent the output of the vertical-pass network 320 (or vice versa). For example, if the original vectors vec(x,y) that form the (input) three-dimensional matrix 220 have 128 components, the recalculated vectors VEC(x,y) that form the (output) three-dimensional matrix 270 may have 256 components, in one exemplary implementation.

In the prediction phase, the neural network 300 may operate in the same order of combinations as in the training phase, in one implementation. In other implementations, the number of passes in the prediction phase may be less (or greater) than in the training phase. For example, if the number of documents to be analyzed is significant, the number of passes (per document) in the prediction phase may be significantly reduced compared with the training phase.

During the prediction phase, upon the completion of a predetermined number of passes (the number of passes may be predetermined during training phase, as the number sufficient to achieve a required accuracy), the neural network 300 may output the transformed three-dimensional matrix 220B having the recalculated values of the vector components VEC(x,y)=$(Z_1, Z_2, \ldots Z_N, Z_{N+1}, Z_{2N})$.

Figure 4:
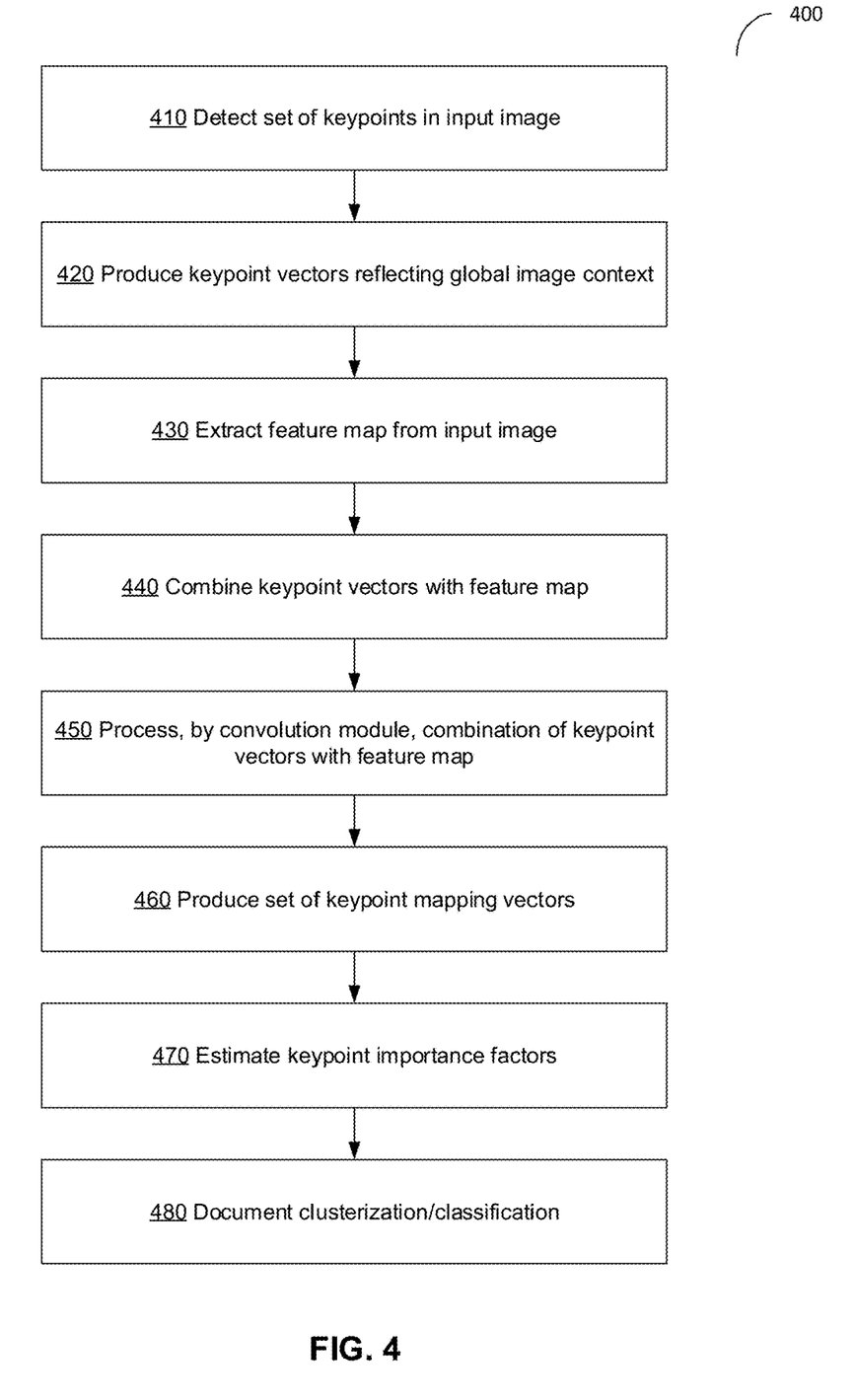
FIG. 4 is a flow diagrams illustrating the method of document classification based on extracted keypoints, in accordance with aspects of the present disclosure.

FIG. 4 is a flow diagrams illustrating an example method 400 of document classification based on extracted keypoints, in accordance with aspects of the present disclosure. The method 400 may be performed by processing logic that may comprise hardware (e.g., circuitry, dedicated logic, programmable logic, microcode, etc.), software (such as instructions run on a processing device), firmware, or a combination thereof. In one implementation, the method 400 may be performed by a processing device (e.g. a processing device 802 of FIG. 6) of a computing device 110 and/or a server machine 140 as described in connection with FIG. 1. In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing the method 400 may be executed asynchronously with respect to each other. Therefore, while FIG. 4 and the associated description list the operations of the method 400 in certain order, various implementations of the methods may perform at least some of the described operations in parallel and/or in arbitrary selected orders.

At operation 410, the processing device implementing the method detects a set of keypoints in the input document image. The detected keypoints are arranged into a three-dimensional matrix, which includes, for every pair of coordinates (x,y) a feature vector corresponding to the keypoint located at the position (x,y) in the document image, as described in more detail herein above.

At operation 420, the processing device processes the three-dimensional matrix representing the detected keypoints by a convolutional neural network that for every input vector (which represents a corresponding keypoint) would produce an output vector reflecting both the corresponding keypoint and the global context of the whole document image, as described in more detail herein above.

At operation 430, the processing device extracts a feature map from the input document image by the feature map extraction module, which may apply a set of convolution filters to the input image. The feature map produced by the feature map extraction module may be represented, e.g., by a matrix of integer or real values, as described in more detail herein above.

At operation 440, the processing device combines the recomputed keypoint vectors with the feature map extracted from the input document image by the feature map extraction module. In some implementations, combining the three-dimensional matrix with the feature map may involve concatenating the vectors of the transformed three-dimensional matrix with the feature map; alternatively, combining the three-dimensional matrix with the feature map may involve summing the vectors of the transformed three-dimensional matrix with the feature map, as described in more detail herein above.

At operation 450, the processing device processes the result of combining the transformed three-dimensional matrix and the feature map by a convolution module, which may include one or more convolution layers, as described in more detail herein above.

At operation 460, the processing device transforms the output of the convolution module into a set of keypoint mapping vectors. In some implementations, the transformation may involve combining two components of the input vector $(Z_1, Z_2, \ldots Z_N, Z_{N+1}, Z_2N)$ according to a predefined mapping scheme (e.g., $Z_k+Z_{N+k} \rightarrow Z_k$) that reduces the number of vector components from 2N to N, as described in more detail herein above.

At operation 470, the processing device estimates the relative importance of each keypoint for the input document image. In some implementation, the set of vectors produced by operation 460 is fed to a set of fully-connected layers, which is trained to estimate the relative importance of each keypoint for the input document image, as described in more detail herein above.

At operation 480, the processing device determines the classification of the input document image based on the set of keypoints with their respective importance factors produced by operation 470, as described in more detail herein above.

Figure 5:
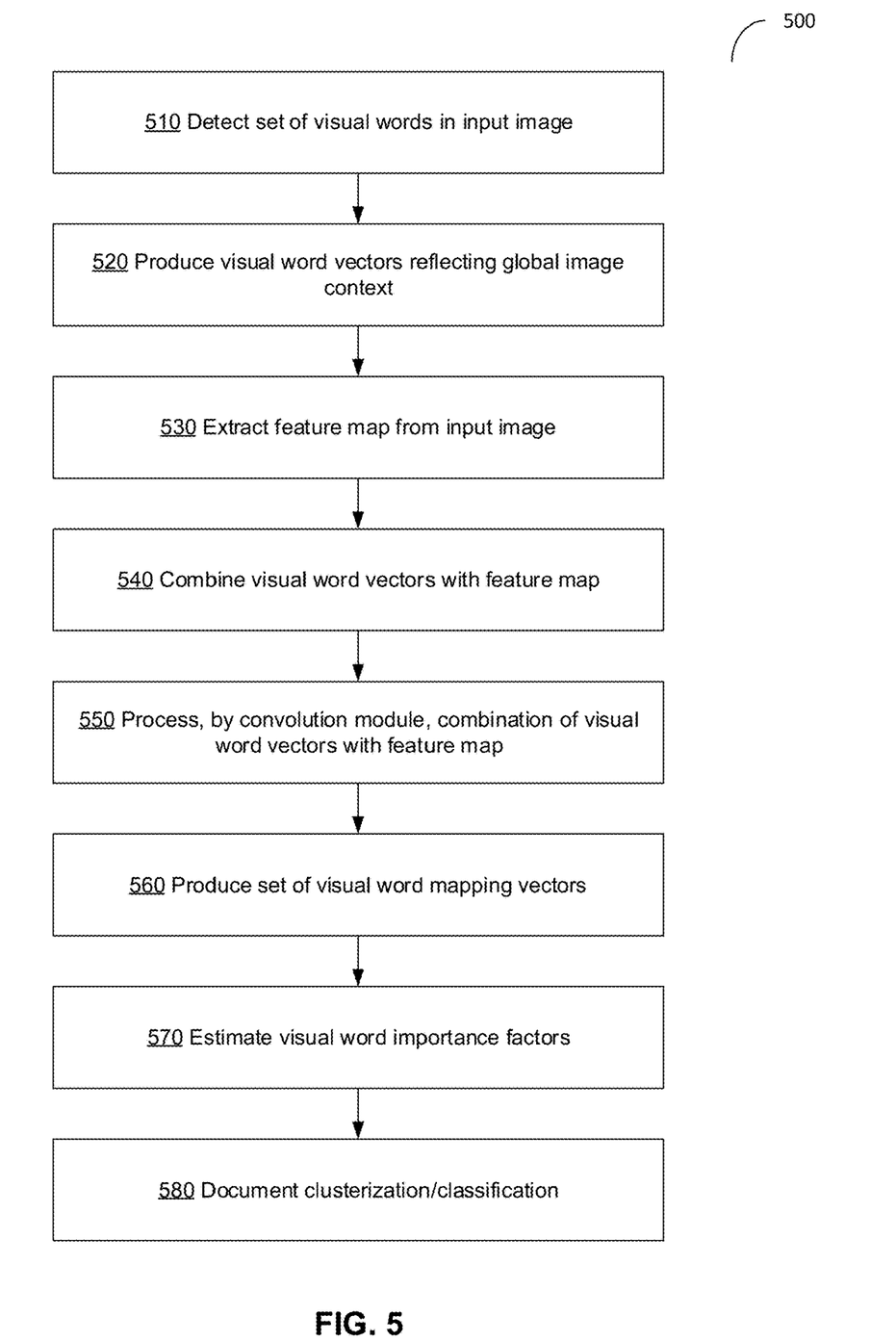
FIG. 5 is a flow diagrams illustrating the method of document classification based on extracted visual words, in accordance with aspects of the present disclosure.

FIG. 5 is a flow diagrams illustrating an example method 500 of document classification based on extracted visual words, in accordance with aspects of the present disclosure. The method 500 may be performed by processing logic that may comprise hardware (e.g., circuitry, dedicated logic, programmable logic, microcode, etc.), software (such as instructions run on a processing device), firmware, or a combination thereof. In one implementation, the method 500 may be performed by a processing device (e.g. a processing device 802 of FIG. 6) of a computing device 110 and/or a server machine 150 as described in connection with FIG. 1. In certain implementations, the method 500 may be performed by a single processing thread. Alternatively, the method 500 may be performed by two or more processing threads, each thread executing one or more individual functions, routines, subroutines, or operations of the method. In an illustrative example, the processing threads implementing the method 500 may be synchronized (e.g., using semaphores, critical sections, and/or other thread synchronization mechanisms). Alternatively, the processing threads implementing the method 500 may be executed asynchronously with respect to each other. Therefore, while FIG. 5 and the associated description list the operations of the method 500 in certain order, various implementations of the methods may perform at least some of the described operations in parallel and/or in arbitrary selected orders.

At operation 510, the processing device implementing the method detects a set of visual words in the input document image. The detected visual words are arranged into a three-dimensional matrix, which includes, for every pair of coordinates (x,y) a feature vector corresponding to the visual word located at the position (x,y) in the document image, as described in more detail herein above.

At operation 520, the processing device processes the three-dimensional matrix representing the detected visual words by a convolutional neural network that for every input vector (which represents a corresponding visual word) would produce an output vector reflecting both the corresponding visual word and the global context of the whole document image, as described in more detail herein above.

At operation 530, the processing device extracts a feature map from the input document image by the feature map extraction module, which may apply a set of convolution filters to the input image. The feature map produced by the feature map extraction module may be represented, e.g., by a matrix of integer or real values, as described in more detail herein above.

At operation 540, the processing device combines the recomputed visual word vectors with the feature map extracted from the input document image by the feature map extraction module. In some implementations, combining the three-dimensional matrix with the feature map may involve concatenating the vectors of the transformed three-dimensional matrix with the feature map; alternatively, combining the three-dimensional matrix with the feature map may involve summing the vectors of the transformed three-dimensional matrix with the feature map, as described in more detail herein above.

At operation 550, the processing device processes the result of combining the transformed three-dimensional matrix and the feature map by a convolution module, which may include one or more convolution layers, as described in more detail herein above.

At operation 560, the processing device transforms the output of the convolution module into a set of visual word mapping vectors. In some implementations, the transformation may involve combining two components of the input vector ($Z_1, Z_2, \ldots Z_N, Z_{N+1}, Z_{2N}$) according to a predefined mapping scheme (e.g., $Z_k + Z_{N+k} \rightarrow Z_k$) that reduces the number of vector components from 2N to N, as described in more detail herein above.

At operation 570, the processing device estimates the relative importance of each visual word for the input document image. In some implementation, the set of vectors produced by operation 560 is fed to a set of fully-connected layers, which is trained to estimate the relative importance of each visual word for the input document image, as described in more detail herein above.

At operation 580, the processing device determines the classification of the input document image based on the set of visual words with their respective importance factors produced by operation 570, as described in more detail herein above.

Figure 6:
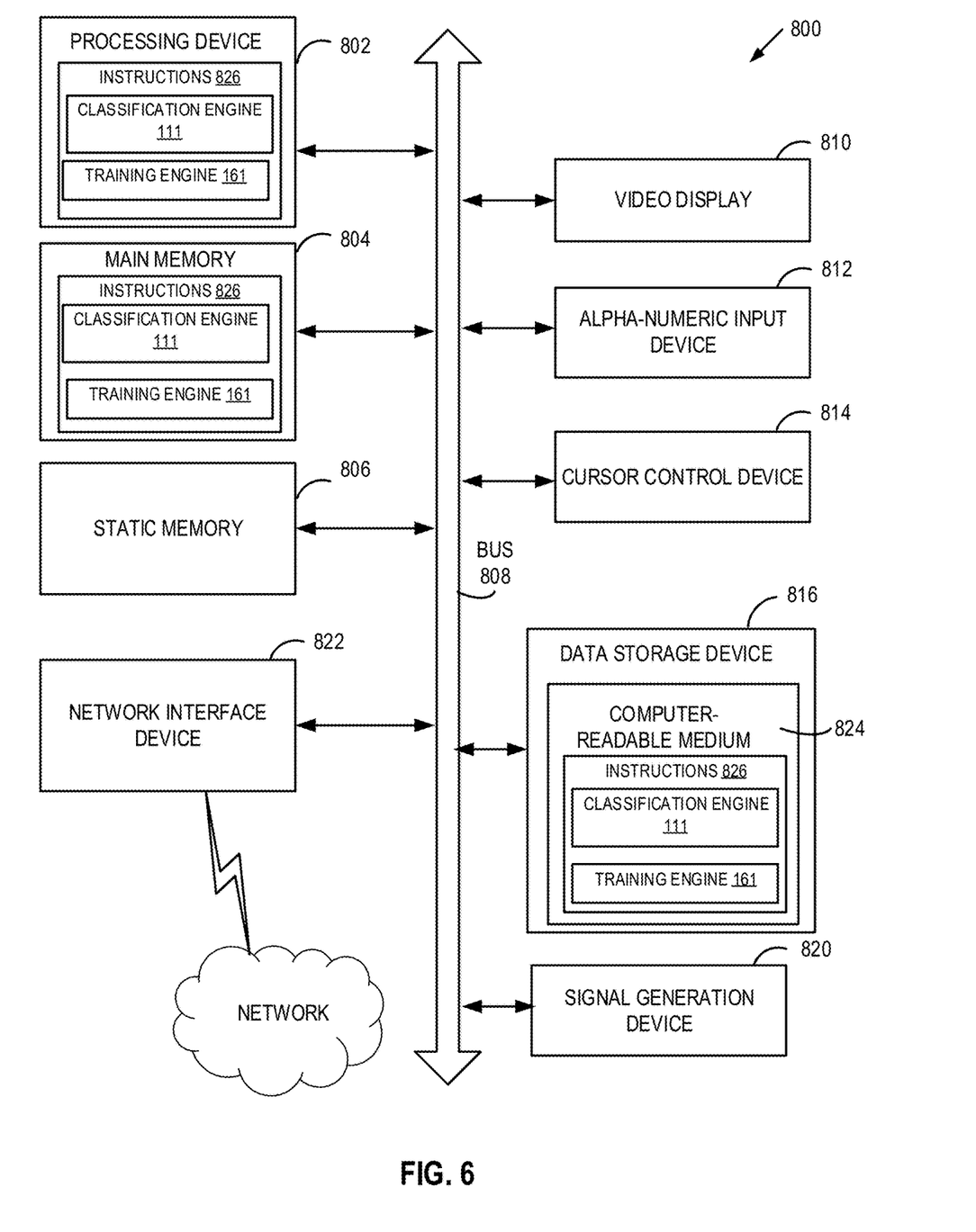
FIG. 6 illustrates a block diagram of a computer system in accordance with some implementations of the present disclosure.

FIG. 6 depicts an example computer system 800 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for implementing the classification engine 111 and/or the training engine 151 of FIG. 1 and to perform the operations and steps discussed herein (e.g., method 400 of FIG. 4 or method 500 of FIG. 5).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored the instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable media. In some implementations, the instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
 detecting, by a processing device, a set of keypoints in an input image;
 generating a set of keypoint vectors, wherein each keypoint vector of the set of keypoint vectors is associated with a corresponding keypoint of the set of keypoints;
 extracting a feature map from the input image;
 producing a combination of the set of keypoint vectors with the feature map;
 transforming the combination into a set of keypoint mapping vectors according to a predefined mapping scheme;
 estimating, based on the set of keypoint mapping vectors, a plurality of importance factors associated with the set of keypoints; and
 classifying the input image based on the set of keypoints and the plurality of importance factors.

2. The method of claim 1, wherein each keypoint vector of the set of keypoint vectors reflects a global context of the input image.

3. The method of claim 1, wherein extracting the feature map from the input image further comprises:
 applying a set of convolution filters to the input image.

4. The method of claim 1, wherein producing the combination of the set of keypoint vectors with the feature map further comprises:
 processing the combination by a neural network comprising one or more convolution layers.

5. The method of claim 1, wherein producing the combination of the set of keypoint vectors with the feature map comprises at least one of: concatenating a first keypoint vector of the set of keypoint vectors with the feature map or summing a second keypoint vector of the set of keypoint vectors with the feature map.

6. The method of claim 1, wherein estimating the plurality of importance factors associated with the set of keypoints further comprises:
 selecting a subset of keypoints having their respective importance factors exceeding a chosen threshold importance value.

7. The method of claim 1, wherein classifying the input image further comprises:
 associating the input image with a cluster of images based on the set of keypoints and the plurality of importance factors.

8. A system comprising:
 a memory; and
 a processing device operatively coupled to the memory, the processing device to:
 detect a set of keypoints in an input image;
 generate a set of keypoint vectors, wherein each keypoint vector of the set of keypoint vectors is associated with a corresponding keypoint of the set of keypoints;
 extract a feature map from the input image;
 produce a combination of the set of keypoint vectors with the feature map;
 transform the combination into a set of keypoint mapping vectors according to a predefined mapping scheme;
 estimate, based on the set of keypoint mapping vectors, a plurality of importance factors associated with the set of keypoints; and
 classify the input image based on the set of keypoints and the plurality of importance factors.

9. The system of claim 8, wherein each keypoint vector of the set of keypoint vectors reflects a global context of the input image.

10. The system of claim 8, wherein extracting the feature map from the input image further comprises:
 applying a set of convolution filters to the input image.

11. The system of claim 8, wherein producing the combination of the set of keypoint vectors with the feature map further comprises:
 processing the combination by a neural network comprising one or more convolution layers.

12. The system of claim 8, wherein producing the combination of the set of keypoint vectors with the feature map comprises at least one of: concatenating a first keypoint vector of the set of keypoint vectors with the feature map or summing a second keypoint vector of the set of keypoint vectors with the feature map.

13. The system of claim 8, wherein estimating the plurality of importance factors associated with the set of keypoints further comprises:
 selecting a subset of keypoints having their respective importance factors exceeding a chosen threshold importance value.

14. The system of claim 8, wherein classifying the input image further comprises:
 associating the input image with a cluster of images based on the set of keypoints and the plurality of importance factors.

15. A non-transitory computer-readable storage medium including executable instructions that, when executed by a computing system, cause the computing system to:
 detect a set of visual words in an input image;
 generate a set of visual word vectors, wherein each visual word vector of the set of visual word vectors is associated with a corresponding visual word of the set of visual words;
 extract a feature map from the input image;
 produce a combination of the set of visual word vectors with the feature map;
 transform the combination into a set of visual word mapping vectors according to a predefined mapping scheme;
 estimate, based on the set of visual word mapping vectors, a plurality of importance factors associated with the set of visual words; and
 classify the input image based on the set of visual words and the plurality of importance factors.

16. The non-transitory computer-readable storage medium of claim 15, wherein each visual word vector of the set of visual word vectors reflects a global context of the input image.

17. The non-transitory computer-readable storage medium of claim 15, wherein producing the combination of the set of visual word vectors with the feature map further comprises:
 processing the combination by a neural network comprising one or more convolution layers.

18. The non-transitory computer-readable storage medium of claim 15, wherein producing the combination of the set of visual word vectors with the feature map comprises at least one of: concatenating a first visual word vector of the set of visual word vectors with the feature map or summing a second visual word vector of the set of visual word vectors with the feature map.

19. The non-transitory computer-readable storage medium of claim 15, wherein estimating the plurality of importance factors associated with the set of visual words further comprises:
   selecting a subset of visual words having their respective importance factors exceeding a chosen threshold importance value.

20. The non-transitory computer-readable storage medium of claim 15, wherein classifying the input image further comprises:
   associating the input image with a cluster of images based on the set of visual words and the plurality of importance factors.

\* \* \* \* \*